(12) United States Patent
Ollis

(10) Patent No.: US 7,062,544 B1
(45) Date of Patent: Jun. 13, 2006

(54) PROVISIONING OF LOCALLY-GENERATED PROMPTS FROM A CENTRAL SOURCE

(75) Inventor: Jeffrey D. Ollis, Harleysville, PA (US)

(73) Assignee: General Instrument Corporation, Horsham, PA (US)

( * ) Notice: Subject to any disclaimer, the term of this patent is extended or adjusted under 35 U.S.C. 154(b) by 635 days.

(21) Appl. No.: 09/661,739

(22) Filed: Sep. 14, 2000

Related U.S. Application Data

(60) Provisional application No. 60/156,248, filed on Sep. 27, 1999.

(51) Int. Cl.
G06F 15/16 (2006.01)

(52) U.S. Cl. .................................. 709/220; 379/88.05

(58) Field of Classification Search ................ 709/217, 709/218, 219, 220, 221; 370/352; 379/88.11, 379/88.12, 88.13, 88.17, 88.18, 67.1, 88.05, 379/88.14, 88.23, 88.27, 88.06; 455/412.1, 455/412.2, 413, 414.1
See application file for complete search history.

(56) References Cited

U.S. PATENT DOCUMENTS

| | | | | |
|---|---|---|---|---|
| 5,214,689 A | * | 5/1993 | O'Sullivan | 379/88.1 |
| 5,469,500 A | * | 11/1995 | Satter et al. | 379/201.03 |
| 5,483,579 A | | 1/1996 | Stogel | |
| 5,488,650 A | | 1/1996 | Greco et al. | |
| 5,493,606 A | * | 2/1996 | Osder et al. | 379/88.05 |
| 5,625,675 A | * | 4/1997 | Katsumaru et al. | 379/88.25 |
| 5,633,484 A | * | 5/1997 | Zancho et al. | 235/380 |
| 5,799,063 A | * | 8/1998 | Krane | 379/88.17 |
| 5,805,672 A | | 9/1998 | Barkat et al. | |
| 5,805,676 A | * | 9/1998 | Martino | 379/93.17 |
| 5,926,624 A | * | 7/1999 | Katz et al. | 709/217 |
| 5,926,789 A | * | 7/1999 | Barbara et al. | 704/270.1 |
| 6,014,428 A | | 1/2000 | Wolf | |
| 6,058,166 A | | 5/2000 | Osder | |
| 6,069,939 A | * | 5/2000 | Fung et al. | 379/67.1 |
| 6,088,428 A | | 7/2000 | Trandal et al. | |
| 6,222,838 B1 | * | 4/2001 | Sparks et al. | 370/352 |
| 6,233,318 B1 | * | 5/2001 | Picard et al. | 379/88.17 |
| 6,266,404 B1 | * | 7/2001 | Chon et al. | 379/93.17 |
| 6,411,686 B1 | * | 6/2002 | Porter et al. | 379/88.18 |
| 6,505,255 B1 | * | 1/2003 | Akatsu et al. | 709/239 |

* cited by examiner

*Primary Examiner*—Marc D. Thompson
(74) *Attorney, Agent, or Firm*—Benjamin D. Driscoll

(57) ABSTRACT

A method and system for providing locally generated prompts/announcements from a centralized source is presented in which voice and text files can be downloaded from a centralized server to a client device. The client device can include a telecommunications gateway which supports telephony services provided over a Hybrid Fiber Coaxial (HFC) network. By downloading files which are appropriate for the user, the client side receives and stores an appropriate subset of the prompt/announcement files available on the server.

9 Claims, 4 Drawing Sheets

PROVISIONING OF LOCALLY-GENERATED PROMPTS FROM A CENTRAL SOURCE

CROSS-REFERENCE TO RELATED APPLICATION

This application claims the priority of Provisional Application Ser. No. 60/156,248, filed Sep. 27, 1999.

TECHNICAL FIELD

The present invention relates to the utilization of prompts and announcements (such as "voice prompts", "text prompts", or call-related announcements) in interactive telephone services and, more particularly, to the provisioning of such prompts in an HFC network environment.

BACKGROUND OF THE INVENTION

New telephony systems are being developed in which equipment for the system is distributed throughout the network rather than being at one central location. As an example, Hybrid Fiber Coax (HFC) networks can support telephony services and typically do so through the deployment of equipment at or near the subscriber site. The HFC network equipment that is deployed at or near the home, often referred to as a "communications gateway", allows telephone service to be provided over the cable TV network, where the communications gateway interacts with a traditional telephone line at the home to provide conventional telecommunications service. In particular, the communications gateway converts the telephone signals originating in the home to a cable compatible signal which is then transported across the cable network and into a traditional circuit switched or Internet telephony based telephone network. In the development of these cable based telephony systems, it is clear that voice prompt technology will be used to support services including voicemail, telephony services configuration, and a host of other features.

As is well-known in the art, voice prompts are frequently used to allow a user to interact with a telephone-based system, including voicemail systems, ordering systems, billing systems and a number of other financial, service based, or informational services. The voicemail prompts are typically coupled with menu systems which allow the user to navigate through the service and select options, retrieve information, and place orders. Responses to the menus are entered using the telephone keypad or are received through a voice recognition system.

The use of voice prompts has allowed a multitude of interactive telephone services to be provided to consumers. Voice prompts can also be utilized to allow a user to configure services and equipment. As an example, voice mailbox features including outgoing messages can be configured using voice prompts and configuration menus.

In the HFC network environment, voice prompt technology will allow the communications gateway to be controlled by the user and provide a number of services including voicemail. The telephone can be used as the basic input device, and users will use the telephone keypad to, among other things, access menus and program the communications gateway. Use of voice prompt technology removes the need for a display on the telephone to permit interactivity with the user. Nevertheless, voice prompt technology will require the use of voice prompt files which will play menus, options and provide configuration information to the user.

Distributed telecommunications systems allow many functions to be offloaded from centralized equipment (e.g. servers) to client side devices. For prompt technology, this allows voice and text prompt files to be stored at the subscriber side, rather than at the server side. This requires that the appropriate prompt files be delivered to the client side equipment. In addition to the problem of locating the appropriate files, difficulties can arise with respect to insuring that the files are updated. For this reason, a method and apparatus of providing locally generated voice prompts from a central source is required. This method should support retrieval and updating of files located on communications gateways which provide telecommunications services over HFC plants.

SUMMARY OF THE INVENTION

In the present invention, prompt/announcement files (i.e., voice files, text files, video, multimedia, etc.) can be located on a central file server and acquired as needed via a common protocol, which can include protocol such as File Transfer Protocol (FTP) or Trivial File Transfer Protocol (TFTP). The files can be loaded individually as needed, as a group, or sequentially in terms of the files that are required by the user.

One of the features of the present invention is that a telephony device, which in the case of an HFC plant is a communications gateway, can access the files from a centralized server. The communications gateway has adequate information to locate the server and in addition has information about the user characteristics such that the appropriate files can be downloaded.

As an example, a user speaking a particular language will have files downloaded to the communications gateway or other telephony or set top device that contains voice/text prompt and announcement files in their native tongue. In this way, the files used by a particular telephony device, communications gateway or set top are customized as needed.

In one embodiment, the downloaded files are voice prompts and/or announcements, which can then be played back through a telephone. The user uses the telephone keypad to navigate through the menus and interact with the system. In another embodiment, the prompts and/or announcements may comprise text files which are downloaded to a television set top. Advantageously, the communications gateway is capable of recognizing the different types of files (e.g., voice or text) and directing the appropriate signal to the appropriate receiving device.

In the present invention, the client side is able to retrieve and store a subset of the files available on the server. User characteristics including language and service configuration can be used to determine the appropriate set of files to be delivered.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings.

DETAILED DESCRIPTION

Figure 1:
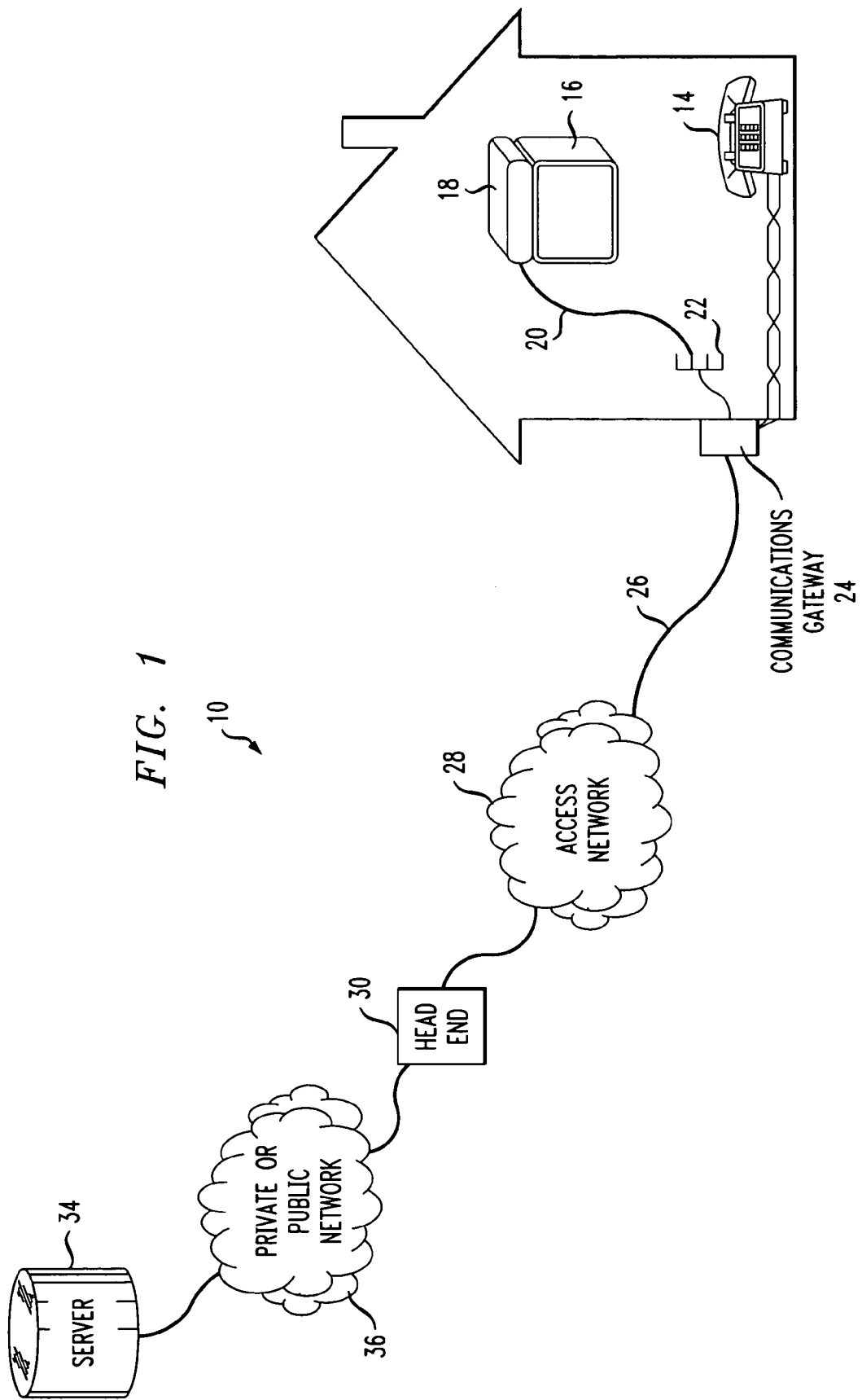
FIG. 1 illustrates a portion of a telecommunications network capable of implementing the present invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose. Moreover, the following descriptions often time refer to "prompts" (defined as messages delivered to a user which require a reply), such as "for the service department, press 1". It is to be understood that the principles of the present invention are equally applicable to situations involving "announcements", such as "you have 5 new messages", which are as common as prompts in many telecommunications applications.

FIG. 1 illustrates, in simplified form, a portion of a communication network 10 implementing the provisioning of locally-generated prompt and announcement files in accordance with the present invention. As shown, network 10 includes a residence 12 containing a telephone 14, a television 16 and television set-top box 18. Television set-top box 18 is connected through coaxial wiring 20 (including a splitter 22) to a communications gateway 24 and receives traditional cable television signals over coaxial wiring 26 from an access network 28. In the embodiment illustrated in FIG. 1, access network 28 comprises a hybrid fiber coaxial network which receives signals from a cable television head end 30, with coaxial cable wiring 32 connecting access network 28 to cable television head end 30. In an alternative embodiment, the access network may comprise a data network, local telephone access network, or any other type of network capable of providing conventional telephone signals to the home.

Telephone 14 can be a traditional telephone with touch-tone type keypad, or can be another telephony device. In the embodiment of FIG. 1, telephone 14 is connected to communications gateway 24 via twisted wire pairs 34 and through an RJ-11 jack (not shown) in communications gateway 24. In an alternative embodiment, other communications means including coaxial cable or in-home wireless connections may be used to connect the telephone to the communications gateway. Television 16 and set-top box 18 are connected via coaxial cable 20 to splitter 22 and in one embodiment, cable television signals are passed directly through communications gateway 24 without processing. In another embodiment, communications gateway 24 intercepts all signals and processes telephone signals as well as television signals, then subsequently supplies the signals to the appropriate device.

FIG. 1 also illustrates a server 34 connected through a private or public network 36 to cable television head end 30. Server 34 contains, for example, voice prompt and/or announcement files and text prompt and/or announcement files. In accordance with the teachings of the present invention, any one (or more) of these files can be selected and then transferred across network 36 to head end 30 and subsequently downloaded to communications gateway 24. In one embodiment, server 34 is located in a remote site and communications gateway 24 accesses files through access network 28 and a public data network, such as the Internet. In another embodiment, network 36 may comprise a private network operated by a service provider. A variety of transport protocols can be used to support communications across the network, including TCP/IP, which is well known to those skilled in the art.

Figure 2:
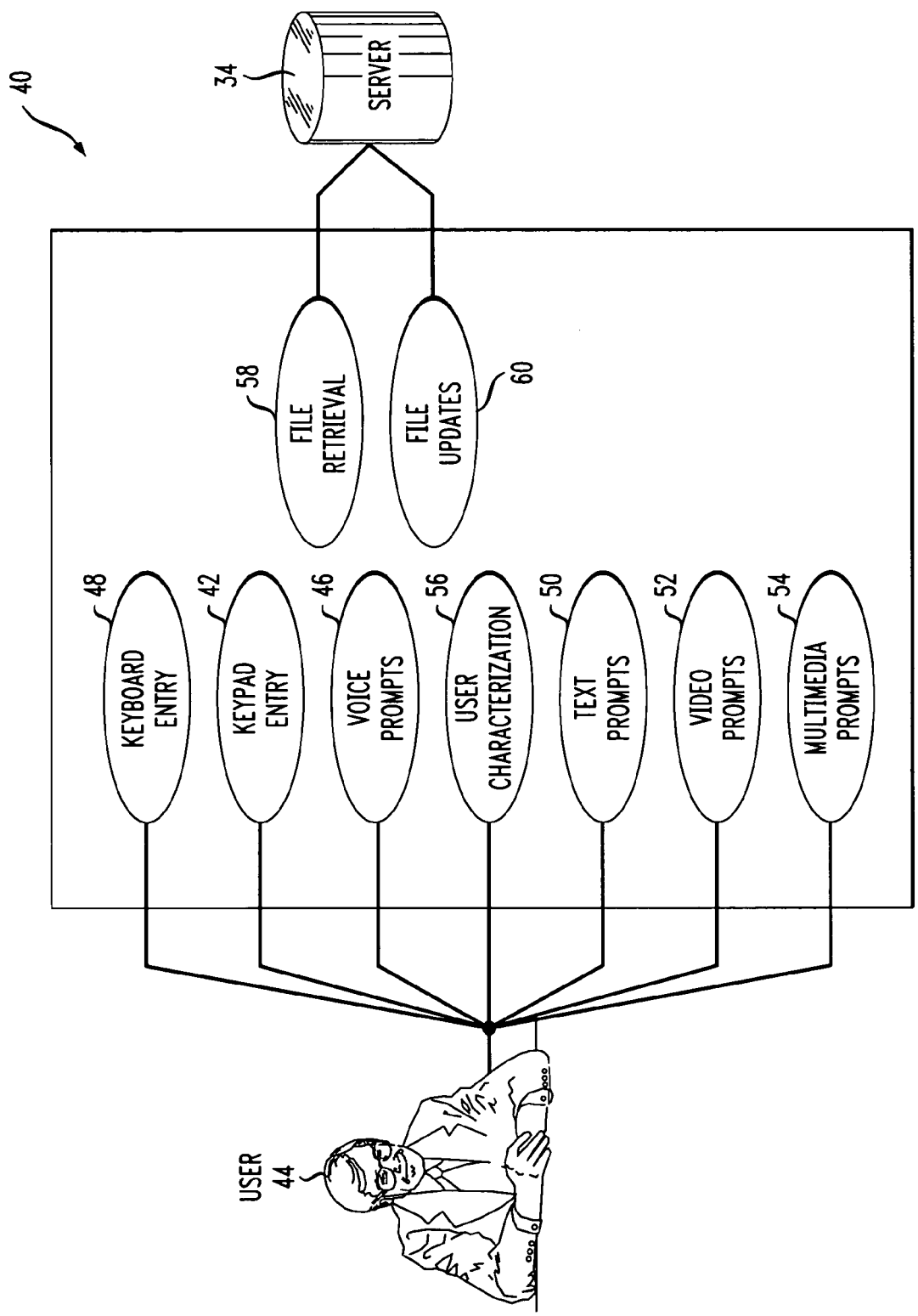
FIG. 2 is a use case diagram of the present invention.

FIG. 2 illustrates a use case diagram 40, containing the various functions which are used in a system formed in accordance with the present invention. In particular, a telephone keypad entry function 42 allows a user 44 to input commands and make selections through the telephone keypad. A voice prompt function 46 plays back voice prompts (and/or announcements) and is coupled with keypad entry function 42 to guide user 44 through the menu and the information system. In a similar manner, computer keyboard entry function 48 allows user 44 to input commands and make selections from among various text prompts/announcements (as well as video or audio, or multimedia files) through the keyboard. Text prompt/announcement file function 50, video prompt/announcement file function 52 and multimedia prompt/announcement file 54 are all coupled to computer keyboard entry function 48. A user characterization function 56 provides the basis for characterizing user 44 and storing that information particular to user 44. User characterizations can include, among other things, the language, address, services and other parameters which are relevant to the various prompts that are required by the user.

File retrieval function 58 accesses prompt/announcement files 46, 50, 52, 54 from centralized server 34 for appropriate downloading and storage. File update function 60 is capable of accessing any of the files when it is required that one or more of them be updated due to a change in the user characterization or because a file itself has changed.

Figure 3:
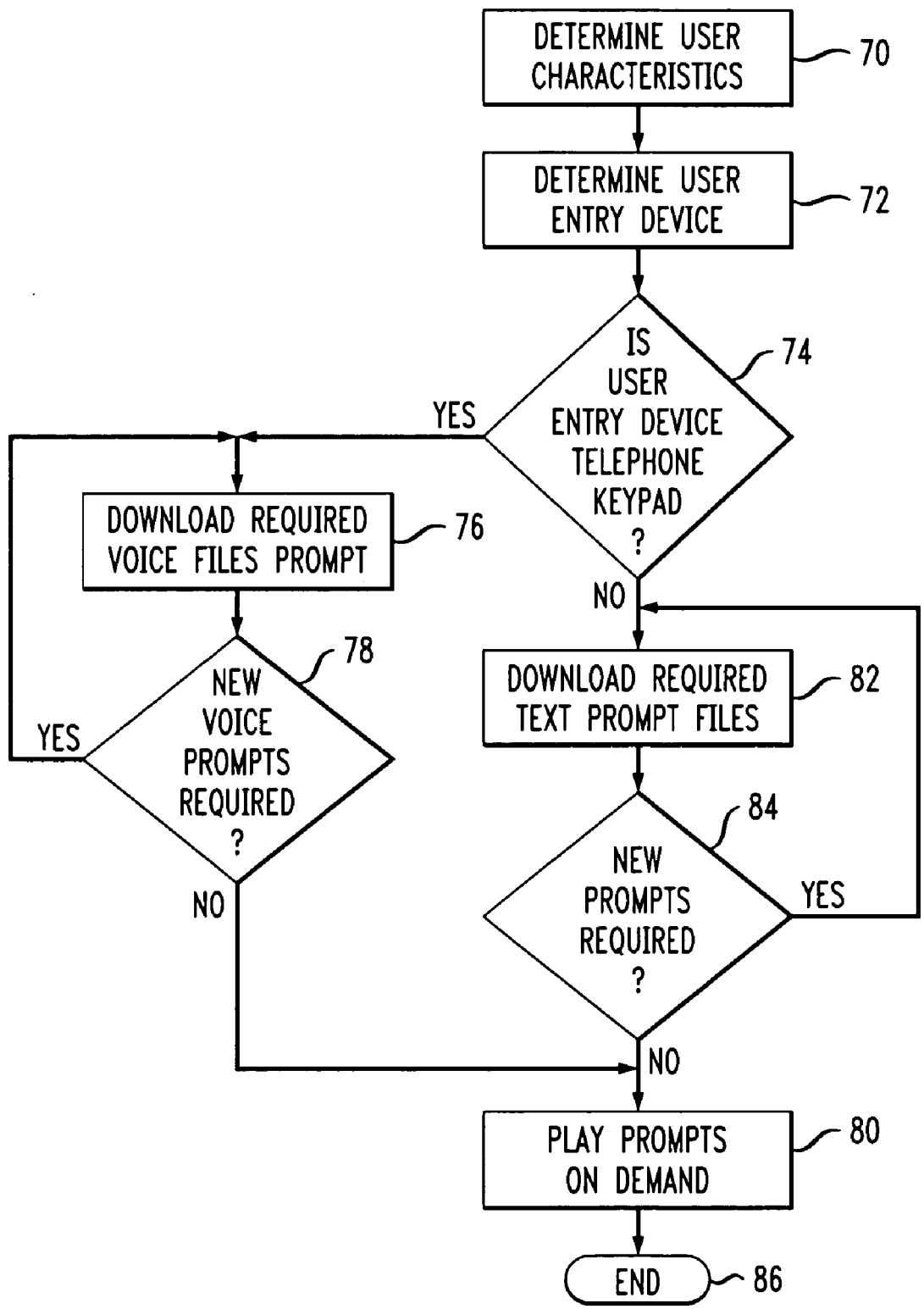
FIG. 3 is a flowchart representing the downloading of voice and text prompt files.

Referring to FIG. 3, a flow chart is provided illustrating the download and use of the prompt/announcement files in accordance with the present invention. In the first step (block 70), the user characteristics are determined either through input by the user or from service records, or through another mechanism. As mentioned above, the user characteristics describe certain parameters of the user which are used in selecting and downloading the required files. The type of user entry device is next determined (block 72), since different types of prompts/announcements are used with different devices. A decision is then made determining if the input device is a telephone keypad (block 74). If so, then the program next requests the download of voice prompt/announcement files from the centralized server (block 76). A test is then run to determine if new voice prompts/announcements are required (block 78). This test may be based on the user service configuration or on the use of certain features in the communications gateway. If new voice files are required, the additional files are downloaded (looping back to block 76), otherwise, the system goes into a standby mode in which it can then play voice prompts/announcements on demand (block 80). Going back to block 74, if the decision is that the entry device is not a telephone keypad (i.e., the input device is a computer keyboard), the program requests download of computer-compatible prompt/announcement files (i.e., text prompt files, video prompt files, multimedia prompt files, etc.). As with the voice prompt files, a test is then run to determine if new prompt files are required (block 84). If so, the program loops back to block 82 and proceeds to download new prompt files from the server. If not, the system goes into standby mode (block 80) and is ready to play the prompts when requested. An end step (block 86) follows the playing of any prompt, although the system remains in a status in which it can play any voice prompt as required.

Figure 4:
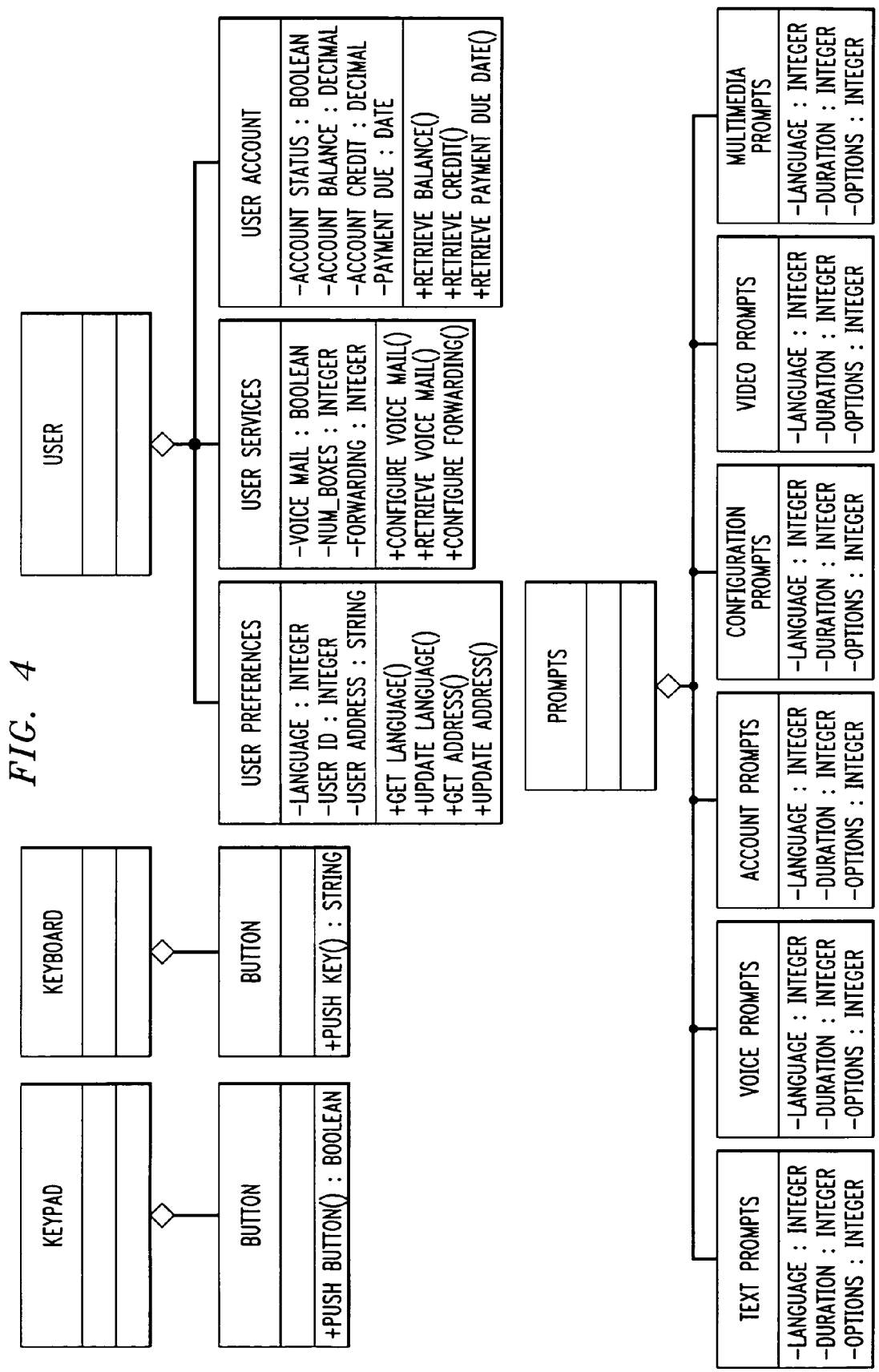
FIG. 4 is a class diagram of the system of the present invention.

FIG. 4 illustrates a class diagram of the system of the present invention, and in particular illustrates the keypad class diagram, keyboard user class diagram, user class diagram and prompts class diagram. As shown, the keypad permits entry of information through push buttons on the keypad. The user class is an aggregation of user information, which can include user preferences, user services, and user account information. Other classes of user information are possible and can be related to the users, households they live in, or the services provided to the users. Also illustrated in FIG. 4 is the general class of prompts, which can be audio, video, text, or multimedia prompts. The prompts are in a specified language and can contain information regarding themselves including the duration of the prompt, and the options. The options are representative of the choices the user is presented, including menus based on use of the telephone keypad. The options can form the basis for interface classes which allow sequential voice prompts or information files (prompts) to be retrieved and played.

The use case diagram shown in FIG. 1 and the class diagram shown in FIG. 4 are based on the use of Unified Modeling Language (UML) which allows the system to be described in a manner such that it can be implemented using a number of programming languages, either procedural or object-oriented. In particular, class diagrams map to object-oriented languages including Java, C++, Smalltalk, Eiffel, Ada, ObjectPascal, Forte, and Visual Basic. Other languages can be used to implement the invention and are well known to those skilled in the art.

Although this invention has been illustrated by reference to specific embodiments, it will be apparent to those skilled in the art that various changes and modifications may be made which clearly fall within the scope of the invention.

What is claimed is:

1. A system for providing locally generated prompts/announcements in a telecommunications network, the system comprising:
   a centralized server for storing a plurality of prompt/announcement files, said plurality including various types of files and organized in a system with respect to user characteristics of a system user;
   a telecommunications device located in close proximity to the system user, said telecommunications device for downloading a user-specified subset of files associated with said user characteristics from said plurality of files; and
   at least one communication device for interacting with said telecommunications device and selecting the user-specified subset of files from said plurality of files to be downloaded,
   wherein said user characteristics include the system user's location.

2. The system as defined in claim 1 wherein the at least one communication device comprises a telephone with a keypad for selecting the user-specified subset of files.

3. The system as defined in claim 2 wherein the selected user-specified subset of files comprise voice files.

4. The system as defined in claim 1 wherein the at least one communication device comprises a computer with a keyboard for selecting the user-specified subset of files.

5. The system as defined in claim 1 wherein the selected user-specified subset of files are chosen from a group consisting of text files, video files and multimedia files.

6. The system as defined in claim 1 wherein the at least one communication device comprises:
   a telephone with a keypad for selecting a first group of user-specified subset of files; and
   a computer with a keyboard for selecting a second group of user-specified subset of files.

7. The system as defined in claim 6 wherein the first group of user-specified subset of files comprises voice files and the second group of user-specified subset of files comprises files chosen from a group consisting of text files, video files and multimedia files.

8. The system as defined in claim 1 wherein the network comprises an HFC network and the telecommunications device comprises a communication gateway.

9. A method of providing client-side prompt/announcement files for use by a subscriber on a local telecommunications device from a plurality of prompt/announcement files stored on a centralized server, the method comprising the steps of:
   a) determining subscriber-specific characteristics from subscriber-provider input;
   b) determining the type of user entry device; and
   c) downloading a subset of prompt/announcement files from the centralized server to the local telecommunications device based upon the subscriber-provided, subscriber-specific characteristics and the determined type of user entry device,
   wherein in performing step a), the subscriber-specific characteristics include location.

* * * * *